US006425239B2

(12) United States Patent
Hoffmann et al.

(10) Patent No.: US 6,425,239 B2
(45) Date of Patent: Jul. 30, 2002

(54) METHOD OF OPERATING A GAS TURBINE

(75) Inventors: Stefan Hoffmann, Mülheim an der Ruhr; Michael Kessler, Oberhausen; Germann Scheer, Erftstadt, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/795,097

(22) Filed: Feb. 28, 2001

Related U.S. Application Data

(63) Continuation of application No. PCT/DE99/02531, filed on Aug. 13, 1999.

(30) Foreign Application Priority Data

Aug. 31, 1998 (DE) ........................................ 198 39 626

(51) Int. Cl.[7] ................................................ F02C 9/26
(52) U.S. Cl. ........................................ 60/39.03; 60/746
(58) Field of Search ............................ 60/39.03, 39.06, 60/39.281, 746, 747

(56) References Cited

U.S. PATENT DOCUMENTS 4,716,719 A 1/1988 Takahashi et al.
4,735,052 A 4/1988 Maeda et al.
4,967,561 A 11/1990 Bruewiler et al.
5,289,685 A * 3/1994 Hoffa .......................... 60/746
5,361,576 A 11/1994 Mueller
5,402,634 A * 4/1995 Marshall ...................... 60/747
5,442,922 A 8/1995 Dyer et al.
5,450,725 A 9/1995 Takahara et al.
5,901,555 A * 5/1999 Mandai et al. ................ 60/747

OTHER PUBLICATIONS

Published International Application No. 98/12478 (Hoffmann et al.), dated Mar. 26, 1998.

* cited by examiner

*Primary Examiner*—Louis J. Casaregola
(74) *Attorney, Agent, or Firm*—Laurence A. Greenberg; Werner H. Stemer; Ralph E. Locher

(57) ABSTRACT

In a gas turbine having a plurality of hybrid burners, each of which has a pilot burner and a main burner, a different pilot fuel quantity is fed to the pilot burners as a function of the load on the gas turbine. This provides both stable operation of the gas turbine at low loads and effective suppression of combustion oscillations at high loads.

5 Claims, 2 Drawing Sheets

METHOD OF OPERATING A GAS TURBINE

CROSS-REFERENCE TO RELATED APPLICATION

This application is a continuation of copending International Application No. PCT/DE99/02531, filed Aug. 13, 1999, which designated the United States.

BACKGROUND OF THE INVENTION

1. Field of the Invention

The invention relates to a method of operating a gas turbine with a plurality of hybrid burners in a combustion chamber. The invention also relates to a gas turbine with a plurality of hybrid burners disposed within the combustion chamber. The principle of a hybrid burner is described in the article titled "Progress in $NO_x$ and CO Emission Reduction of Gas Turbines", by H. Maghon, P. Behrenbrink, W. Termuehlen and G. Gartner, ASME/IEEE Power Generation Conference, Boston, October 1990. Published, Non-Prosecuted German Patent Application DE 196 37 725 A1 describes a method and a device for burning fuel with air in a combustion chamber. The air is supplied to the combustion chamber through at least one air inlet and the fuel is supplied through to a plurality of burners. In this configuration, each burner has a characteristic phase response, for example an associated delay period, corresponding to a time duration after which an acoustic pulse in the combustion chamber causes a thermal pulse due to combustion of the fuel supplied to the burner. The supply of the fuel to the burners is controlled in such a way that the delay periods of the burners are essentially different from one another. The delay period of a burner corresponds to a phase difference at the location of the burner between an acoustic oscillation in the combustion chamber and a thermal oscillation at the burner. Such combustion oscillations are caused by the interaction between the acoustics of the combustion chamber and a release of thermal output during the combustion. These combustion oscillations can lead to high levels of noise annoyance or even to mechanical damage. In a configuration with a plurality of burners in a combustion chamber, the combustion oscillations emerging from the individual burners can reinforce one another. Because the burners are supplied with different fuel quantities, the delay periods for the burners are different. The delay period of a burner in a combustion chamber is composed of different summands, which can be respectively attributed to individual components of the system containing burners, the combustion chamber and the flame. The summands that can be related to the burner and the combustion chamber are mainly determined by the geometry of the burner and the combustion chamber. A summand that can be attributed to the flame itself is essentially determined by the properties of the combustion itself. The summand itself can be further broken down into a convective delay period, which characterizes a transport time for the transport of the reaction partners to the flame front where the combustion is initiated, a heating time, which gives the time for the heating of the reaction partners to the temperature necessary for ignition, and a reaction kinetics delay period which is determined by the course of the combustion itself. As a rule, the convective delay period clearly outweighs the two other summands. Different delay periods for the various burners lead to the fact that the combustion oscillations emerging from the individual burners can no longer reinforce one another.

SUMMARY OF THE INVENTION

It is accordingly an object of the invention to provide a method of operating a gas turbine and a corresponding gas turbine which overcome the above-mentioned disadvantages of the prior art devices and methods of this general type, in which combustion oscillations are substantially suppressed. A further object of the invention is to provide a gas turbine that has favorable properties, in particular with respect to a low tendency to develop combustion oscillations.

With the foregoing and other objects in view there is provided, in accordance with the invention, a method of operating a turbine. The method includes the step of providing a gas turbine having a plurality of hybrid burners disposed in a combustion chamber. Each of the hybrid burners have a pilot burner and a main burner, and a pilot fuel quantity is supplied to the pilot burner. At least two of the pilot burners are operated with different pilot fuel quantities, a difference in the pilot fuel quantity being set in dependence on a load of the gas turbine.

According to the invention, the object directed toward the method is achieved by a method of operating a combustion configuration with a plurality of hybrid burners in a combustion chamber. Each of the hybrid burners has the pilot burner and the main burner and a pilot fuel quantity is supplied to each pilot burner. At least two of the pilot burners are operated with a different pilot fuel quantity, the difference in the pilot fuel quantity being set as a function of an effective output of the combustion configuration.

The pilot burner preferably operates as a diffusion burner, i.e. fuel and combustion air are mixed and burnt by diffusion in the combustion chamber. The main burner is a premixing burner, i.e. the fuel and the combustion air are mixed before entry into the combustion chamber and are subsequently burnt. In this configuration, the fuel mixture of the main burner usually ignites on the flame of the pilot burner.

The burner configuration effects the output. The effective output can, for example, be the output for a heating boiler or an output for driving a turbine. High effective outputs are achieved by the operation of the main burner, the pilot burners being mainly responsible for stabilizing the combustion of the main burner. At low effective outputs, the pilot burners can also operate exclusively as diffusion burners.

As described above, a combustion oscillation can develop in such a burner configuration. The invention is based on the knowledge that a static supply of a different fuel quantity to the burners in order to suppress combustion oscillations is not feasible over the whole range of the possible effective output, also referred to as the load, of the burner configuration. At lower effective outputs, the pilot burners must usually be supplied with a high quantity of fuel in order to provide stable ignition of a weak fuel mixture in the main burner. If now, in the case of at least two of the pilot burners, the respectively supplied pilot fuel quantities are set as a function of the effective output of the burner configuration, detuning of the burners relative to one another and adapted to the respective operating conditions, occurs. The supply of different pilot fuel quantities is matched to the minimum pilot fuel quantity required to stabilize the combustion. The burner configuration can, therefore, be operated stably at low loads, and, combustion oscillations can be effectively suppressed by the supply of different pilot fuel quantities to at least two of the pilot burners due to the different delay periods of the pilot burners brought about in this way.

The difference in the pilot fuel quantity preferably increases with increasing effective output (load). Therefore, it is possible to set a larger difference in the pilot fuel quantity at increased effective output without impairing the stability of the combustion. Since it is precisely at higher effective outputs that troublesome combustion oscillations occur, operation of the pilot burners with different pilot fuel quantity is particularly advantageous in this case for suppressing combustion oscillations.

At maximum load of the gas turbine, a major proportion of the hybrid burners are preferably operated with between one and two percent of a maximum pilot fuel quantity and the rest of the hybrid burners are operated with between 5 and 15 percent of the maximum pilot fuel quantity.

At effective outputs or loads above XX% (i.e. 60%) of the maximum effective output of the combustion configuration, a first number of the hybrid burners is preferably operated with a first pilot fuel quantity and a second number of the hybrid burners is preferably operated with a second pilot fuel quantity. The first number being more than XX (i.e. four) times as large as the second number and the second pilot fuel quantity being more than XX (i.e. two) times as large as the first pilot fuel quantity. At effective outputs above 60% of the maximum effective output of the burner configuration, it is sufficient to operate a comparatively small number of the hybrid burners with a pilot fuel quantity that is smaller than that of the other hybrid burners. In this way, an output release from the pilot burners is scarcely reduced and, nevertheless, combustion oscillation is effectively suppressed. The method is preferably employed in a gas turbine with an annular combustion chamber. This can be a stationary gas turbine or an aircraft engine. In the case of the large effective outputs of a gas turbine, very strong combustion oscillations can occur. It is precisely in the case of an annular combustion chamber that such combustion oscillations are practically impossible to predict and must be countered by additional measures. The different setting, as a function of load, of the pilot fuel quantities offers a simple and efficient method of suppressing combustion oscillations in this case.

According to the invention, the object directed toward a gas turbine is achieved by a gas turbine with a plurality of hybrid burners in a combustion chamber. Each of the hybrid burners has a pilot burner and a main burner. It being possible to feed a pilot fuel quantity to each of the pilot burners. A control unit is provided for the control, as a function of a load, of a supply of different pilot fuel quantities to at least two of the pilot burners.

Other features which are considered as characteristic for the invention are set forth in the appended claims.

Although the invention is illustrated and described herein as embodied in a method of operating a gas turbine and a corresponding gas turbine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
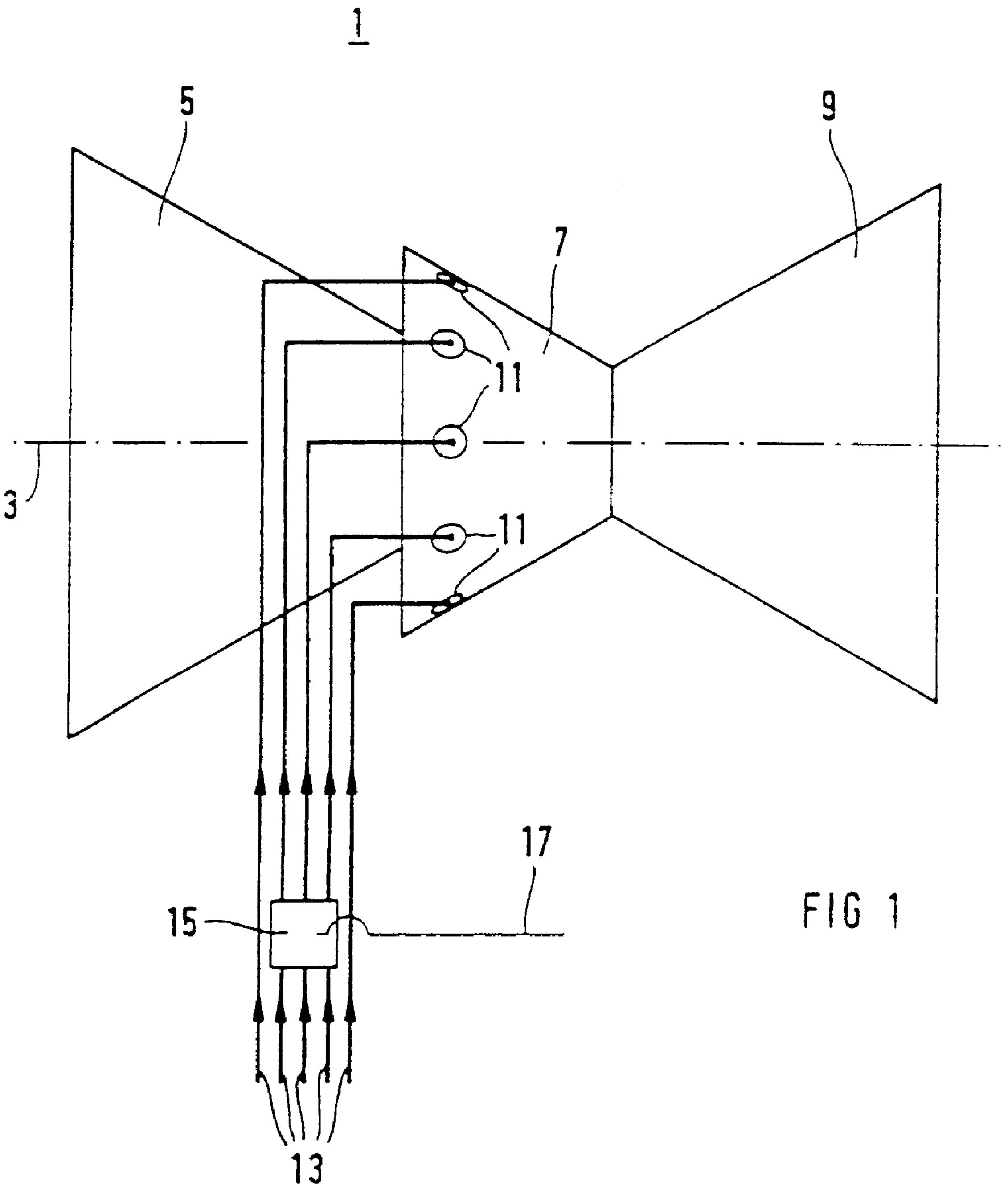
FIG. 1 is a diagrammatic illustration that is not to scale, of a gas turbine with an annular combustion chamber according to the invention.

In all the figures of the drawing, sub-features and integral parts that correspond to one another bear the same reference symbol in each case. Referring now to the figures of the drawing in detail and first, particularly, to FIG. 1 thereof, there is shown a gas turbine 1 aligned along an axis 3. A compressor 5, an annular combustion chamber 7 and a turbine 9 are disposed, one behind the other, along the axis 3. A number of hybrid burners 11 are disposed along a periphery of the annular combustion chamber 7. A fuel supply line 13 for supplying pilot fuel leads to each of the hybrid burners 11. A control unit 15 is connected into a proportion of the fuel supply lines 13. The control unit 15 could also be connected into all the fuel supply lines 13. In addition, a signal line 17 leads to the control unit 15.

The gas turbine 1 can be operated at different effective outputs or loads. The output released from a combustion of fuel and combustion air leads to an effective output of the gas turbine 1. A signal, which reproduces the magnitude of an instantaneous effective output of the gas turbine 1, leads via the signal line 17 to the control unit 15. On the basis of this signal, the control unit 15 controls the pilot fuel quantity in the connected fuel supply lines 13. The control unit 15 does not necessarily need to be directly connected to the fuel supply lines 13. It could also activate valves that are disposed in the fuel supply lines 13. At least two of the hybrid burners 11 are fed with a different pilot fuel quantity by the control unit 15. Different delay periods occur for these hybrid burners 11 due to the different pilot fuel quantity. In this case, the delay periods characterize a phase difference between an acoustic oscillation in the combustion chamber 7 and an oscillation of a release of thermal output at the respective hybrid burner 11. Due to the different delay periods, these phase relationships are modified in such a way that combustion oscillations, which emerge from the individual hybrid burners 11, attenuate one another, or at least do not mutually reinforce one another. The development of a combustion oscillation is thereby suppressed.

Figure 2:
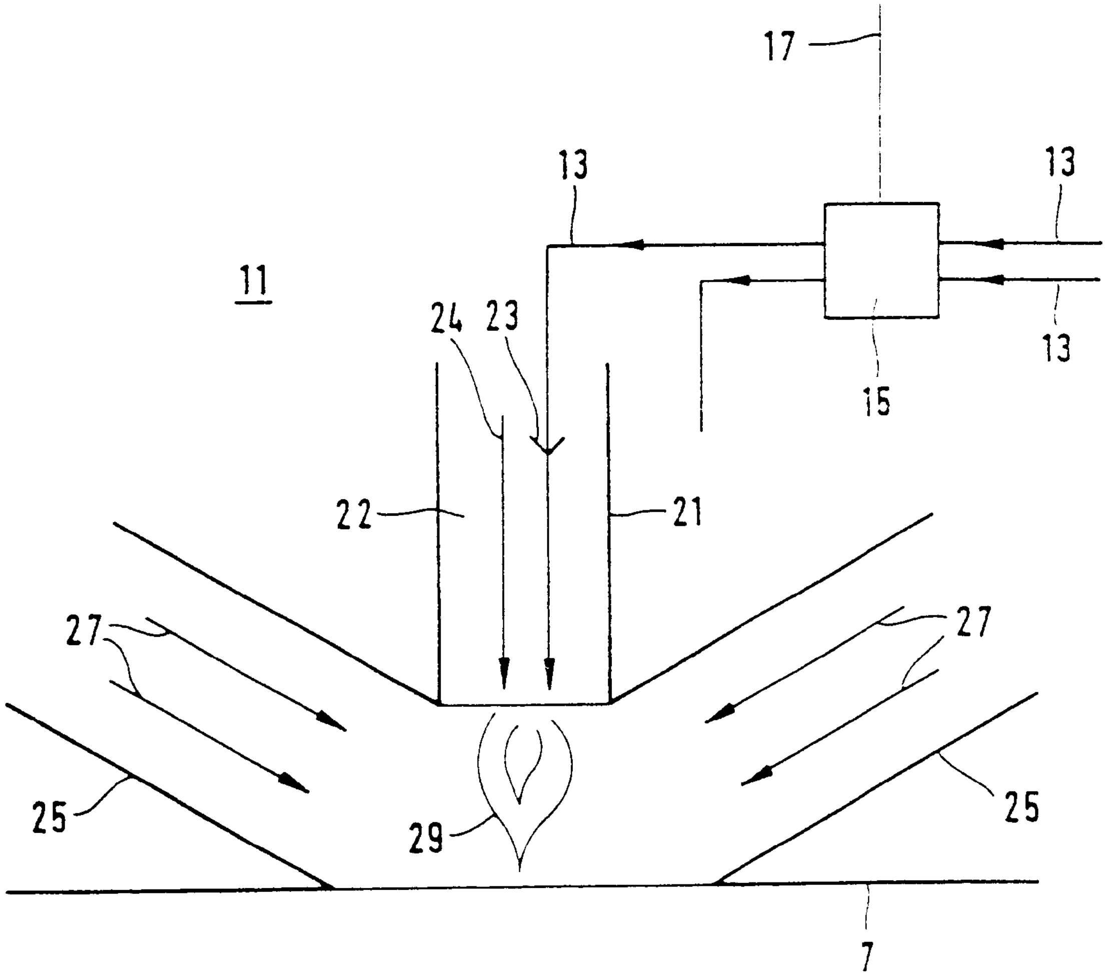
FIG. 2 is a longitudinal sectional view through a hybrid burner.

FIG. 2 shows, diagrammatically and in longitudinal section, the hybrid burner 11. The hybrid burner 11 has a central pilot burner 21. A pilot fuel quantity 23 is supplied to the pilot burner 21 by the fuel supply line 13 and combustion air 24 is supplied by an air duct 22. The pilot burner 21 is concentrically surrounded by a main burner 25 shaped like an annular duct. A premixed fuel/air flow 27, which ignites on a pilot flame 29 of the pilot burner 21, is supplied in the main burner 25. The control unit 15 is connected into the fuel supply line 13. The control unit 15 controls, as a function of a signal from the signal line 17, the pilot fuel quantity 23 supplied in the fuel supply line 13. This control then takes place as a function of the output delivered by the gas turbine 1 in which the hybrid burner 11 is installed. At a lower effective output, the maximum pilot fuel quantity 23 is supplied to the pilot burner 21 in order to provide stable ignition, by an intensive pilot flame 29, for a relatively weak fuel/air mixture 27 in the main burner 25. In the case of a higher output, there is a richer mixture for the fuel/air flow 27. In consequence, a somewhat smaller pilot fuel quantity 23 is also sufficient in order, with the aid of the pilot flame 29, to maintain stable combustion of the fuel/air mixture 27.

A small proportion of the hybrid burners 11 is operated with a pilot fuel quantity that is increased relative to the rest of the hybrid burners 11. This effects efficient suppression of combustion oscillations.

We claim:

1. A method of operating a turbine, which comprises the steps of:

providing a gas turbine having a plurality of hybrid burners disposed in a combustion chamber, each of the hybrid burners having a pilot burner and a main burner, and a pilot fuel quantity being supplied to the pilot burner; and operating at least two of the pilot burners with a different pilot fuel quantity, a difference in the pilot fuel quantity being set in dependence on a load of the gas turbine.

2. The method according to claim 1, which comprises setting the difference in the pilot fuel quantity to increase with an increasing load.

3. The method according to claim 1, which comprises during a maximum load of the gas turbine, operating a major proportion of the hybrid burners between one and two percent of a maximum pilot fuel quantity and a remainder of the hybrid burners are operated with between five and 15 percent of the maximum pilot fuel quantity.

4. The method according to claim 1, which comprises during loads above 60% of a maximum load on the gas turbine, operating a first number of the hybrid burners with a first pilot fuel quantity and operating a second number of the hybrid burners with a second pilot fuel quantity, the first number being more than four times as large as the second number and the second pilot fuel quantity being more than two times as large as the first pilot fuel quantity.

5. The method according to claim 1, which comprises providing the combustion chamber of the gas turbine as an annular combustion chamber.

* * * * *